(12) United States Patent
Tran et al.

(10) Patent No.: US 12,160,346 B1
(45) Date of Patent: Dec. 3, 2024

(54) SYSTEM AND METHOD FOR REESTABLISHING NETWORK CONNECTIVITY FOR PARTICULAR NETWORK EQUIPMENT IN A FAILED NETWORK ZONE

(71) Applicant: Bank of America Corporation, Charlotte, NC (US)

(72) Inventors: Ngoc Tran, Charlotte, NC (US); Saurabh Garg, Faridabad (IN); Maneesh Kumar Sethia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 60 days.

(21) Appl. No.: 18/319,897

(22) Filed: May 18, 2023

(51) Int. Cl.
*H04L 41/12* (2022.01)
*H04L 43/0811* (2022.01)
*H04L 45/02* (2022.01)

(52) U.S. Cl.
CPC .......... *H04L 41/12* (2013.01); *H04L 43/0811* (2013.01); *H04L 45/04* (2013.01)

(58) Field of Classification Search
None
See application file for complete search history.

(56) References Cited

U.S. PATENT DOCUMENTS

| | | | |
|---|---|---|---|
| 5,862,362 A * | 1/1999 | Somasegar | G06F 11/3664 714/E11.208 |
| 9,088,525 B2 | 7/2015 | Takeda et al. | |
| 9,959,572 B2 * | 5/2018 | Iannaccone | H04L 67/1095 |
| 9,979,605 B2 | 5/2018 | Sinn | |
| 10,237,362 B2 | 3/2019 | Almond et al. | |
| 10,958,419 B2 | 3/2021 | Schuler et al. | |
| 10,966,105 B2 | 3/2021 | Yamada | |
| 11,108,677 B2 | 8/2021 | Lui et al. | |
| 11,418,510 B2 | 8/2022 | Lai et al. | |
| 11,575,559 B1 | 2/2023 | Khanna et al. | |
| 2003/0149775 A1 * | 8/2003 | O'Neill | H04L 9/40 709/227 |
| 2012/0020300 A1 | 1/2012 | Sheriff et al. | |
| 2015/0256488 A1 | 9/2015 | Cole et al. | |
| 2016/0191370 A1 | 6/2016 | Wood | |
| 2016/0249282 A1 * | 8/2016 | Zhou | H04W 4/24 |

(Continued)

*Primary Examiner* — Quang N Nguyen (57) ABSTRACT

A system for reestablishing network connectivity for particular network equipment in a failed network zone comprises a processor associated with a server. The processor receives a flag that identifies the failed network zone including particular network equipment that have lost network connectivity in a network. The processor generates a first non-fungible token using the configuration information associated with each of the particular network equipment. The processor determines routing information based at least in part upon the configuration information and a network topology. The processor generates a second non-fungible token based at least in part upon the routing information. The processor aggregates the first non-fungible token and the second non-fungible token to generate a primary non-fungible token. The processor reestablishes network connectivity for at least a portion of the particular network equipment based at least in part upon information associated with the primary non-fungible token.

20 Claims, 2 Drawing Sheets

(56) References Cited

U.S. PATENT DOCUMENTS

| | | |
|---|---|---|
| 2017/0289027 A1 | 10/2017 | Ratnasingham |
| 2017/0317780 A1 | 11/2017 | Wood et al. |
| 2019/0215756 A1 | 7/2019 | Park et al. |
| 2019/0222605 A1 | 7/2019 | Key et al. |
| 2019/0386921 A1 | 12/2019 | Pignataro et al. |
| 2020/0077310 A1* | 3/2020 | Cheng .................. H04W 76/27 |
| 2020/0389502 A1 | 12/2020 | Kung et al. |
| 2021/0084531 A1 | 3/2021 | Sherman et al. |
| 2021/0176705 A1 | 6/2021 | Chandra et al. |
| 2024/0283731 A1* | 8/2024 | Wang ...................... H04L 45/24 |

* cited by examiner

SYSTEM AND METHOD FOR REESTABLISHING NETWORK CONNECTIVITY FOR PARTICULAR NETWORK EQUIPMENT IN A FAILED NETWORK ZONE

TECHNICAL FIELD

The present disclosure relates generally to network communications and information security, and more specifically to a system and method for reestablishing network connectivity for particular network equipment in a failed network zone.

BACKGROUND

A network outage may occur in a computer system due to many issues associated with various network equipment. For example, the network equipment may not automatically failover from a primary supervisor card to a secondary supervisor card to maintain network connectivity. When the network outage occurs, a user associated with the network equipment may experience a delay in receiving related services. Data loss may also occur in interactions in the computer system. Current technology does not provide an efficient and effective solution to prevent the computer system from the network outage.

SUMMARY

Current technology is not configured to provide a reliable and efficient solution to reestablish network connectivity for particular network equipment in a failed network zone. The system described in the present disclosure is particularly integrated into a practical application and provides technical solutions to reestablish network connectivity for particular network equipment in a failed network zone in real time.

In a conventional system, a connection failure occurred in a network zone with particular network equipment may interrupt user interactions with a contact center associated with the entity. The connection failure occurred during the interaction may cause data loss, a service delay, or an interaction abandonment. The present system addresses this issue by determining and processing configuration information and routing information associated with each of particular network equipment in a failed network zone to provide network connectivity for at least a portion of the particular network equipment. In some embodiments, a central server may obtain configuration information of the particular network equipment based on a flag that identifies a failed network zone. The central server may determine routing information to provide network connectivity to the particular network equipment based at least in part upon the configuration information and a network topology. The central server may generate a first non-fungible token using configuration information associated with each of the particular network equipment in the failed network zone. The central server may generate a second non-fungible token based at least in part upon the routing information. The central server may generate a primary non-fungible token by aggregating the first non-fungible token associated with the configuration information and the second non-fungible token associated with the routing information. The central server may use the information of primary non-fungible token to reestablish network connectivity for at least a portion of the particular network equipment.

In one embodiment, the system for reestablishing network connectivity for particular network equipment in a failed network zone comprises a processor and a memory. The processor receives a flag that identifies a failed network zone. The failed network zone comprises particular network equipment that have lost network connectivity in a network. Each particular network equipment is associated with a corresponding identifier. The processor obtains configuration information associated with each of the particular network equipment using each corresponding identifier. The processor generates a first non-fungible token using the configuration information. The processor determines routing information to provide network connectivity to the particular network equipment based at least in part upon the configuration information and a network topology of the network. The processor generates a second non-fungible token based at least in part upon the routing information. The processor validates the first non-fungible token and the second non-fungible token by sending a data object according to the configuration information and the routing information to determine whether any errors are generated. In response to determining that no errors are generated, the processor aggregates the first non-fungible token and the second non-fungible token to generate a primary non-fungible token. The processor reestablishes network connectivity for at least a portion of the particular network equipment based at least in part upon the information associated with the primary non-fungible token.

The system described in the present disclosure provides technical solutions to solve the technical problems of the previous systems. The disclosed system provides a practical application that improves the information security of the computer system by reestablishing network connectivity for particular network equipment in a failed network zone. For example, the central server may generate a first non-fungible token using the configuration information to authenticate a failed network zone with the particular network equipment. The central server may use a machine learning model to determine the network topology associated with the particular network equipment in the failed network zone. Further, the central server may determine routing information to provide network connectivity to the particular network equipment based at least in part upon the configuration information and the network topology. The central server may generate a primary non-fungible token to validate the first non-fungible token associated with the configuration information of each of the particular network equipment and the second non-fungible token associated with the routing information. The central server may use information of the primary non-fungible token to reestablish network connectivity for the particular network equipment. In this way, each operation of reestablishing network connectivity for particular network equipment may be authenticated, triggered and securely validated with different non-fungible tokens. As such, the disclosed system may provide technical advantages of improving the underlying operations of computer systems in real time to efficiently prevent network failures, interaction failures and data loss. The disclosed system may further improve network security by preventing computer systems from network outrage and data loss.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide efficient and reliable solutions to prevent a computer system from a network outage in a failed network zone. This disclosure presents a system for reestablishing network connectivity for particular network equipment in a failed network zone by referring to FIGS. 1-2.

System Overview

Figure 1:
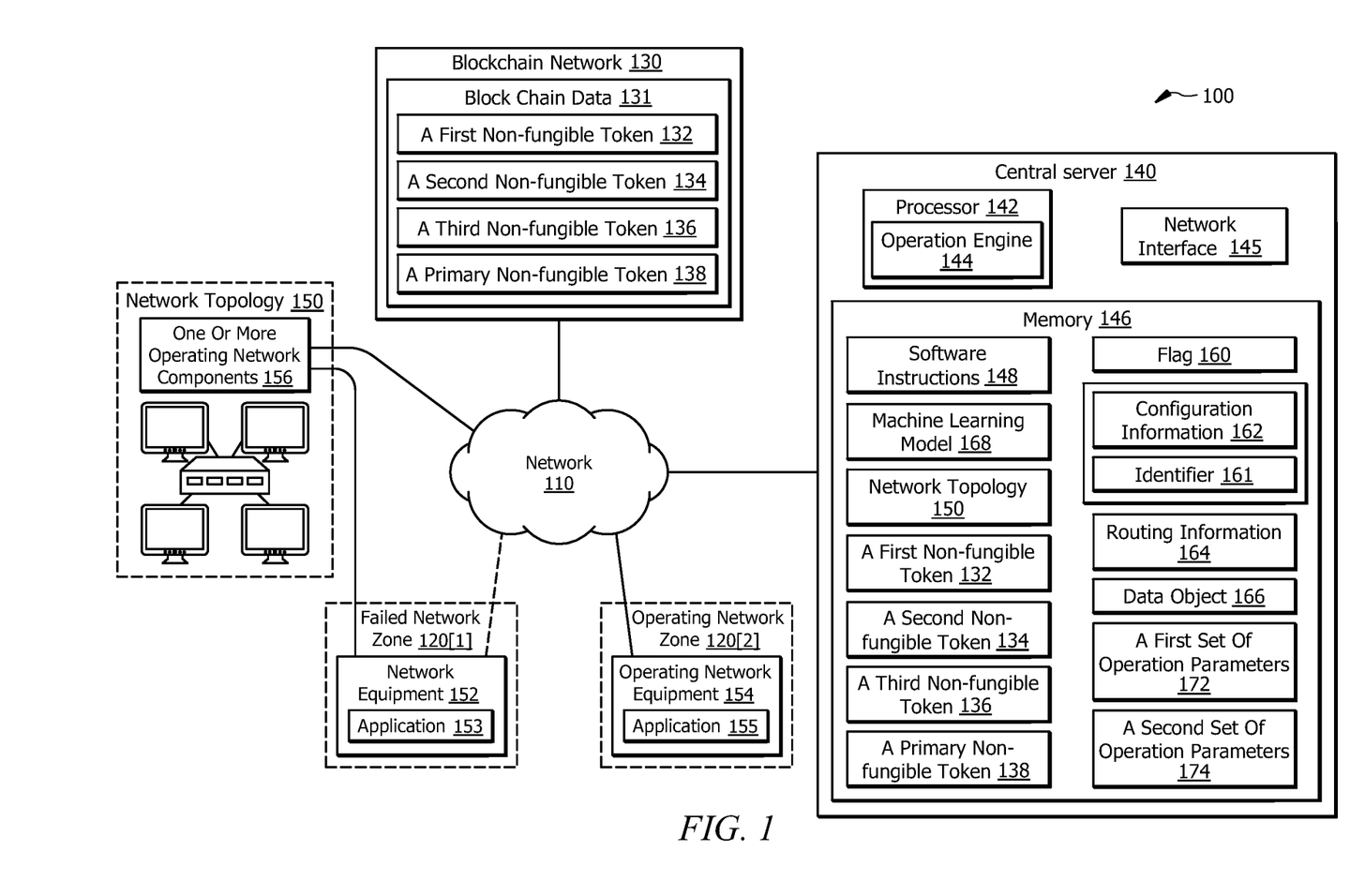
FIG. 1 illustrates an embodiment of a system configured to reestablish network connectivity for particular network equipment in a failed network zone.

FIG. 1 illustrates one embodiment of a system 100 that is configured to reestablish network connectivity for particular network equipment in a failed network zone 120[1] in a network 110. In one embodiment, system 100 comprises a central server 140, a blockchain network 130, a plurality of network equipment such as network equipment 152 and 154 in a plurality of network zones 120, and a network 110. Network 110 enables communications between components of the system 100. Central server 140 comprises a processor 142 in signal communication with a memory 146. Memory 146 stores software instructions 148 that when executed by the processor 142, cause the processor 142 to perform operations illustrated in FIGS. 1-2. Blockchain network 130 is a public distributed ledger network which may be referred to a distributed database shared by a plurality of computing equipment in the network 110.

In some embodiments, a central server 140 may receive a flag 160 that identifies a failed network zone 120[1] and obtain configuration information 162. For example, the central server 140 may obtain configuration information 162 of the particular network equipment 152 based on a flag 160 that identifies a failed network zone 120[1]. The central server 140 may determine routing information 164 to provide network connectivity to the particular network equipment 152 based at least in part upon the configuration information 162 and a network topology 150. The central server 140 may generate a first non-fungible token 132 using configuration information 162 associated with each of the particular network equipment 152 in the failed network zone 120[1]. The central server 140 may determine routing information 164 to provide network connectivity to the particular network equipment 152 based at least in part upon the configuration information 162 and a network topology 150. The central server 140 may generate a second non-fungible token 134 based at least in part upon the routing information 164. The central server 140 may generate a primary non-fungible token 138 by aggregating the first non-fungible token 132 associated with the configuration information 162 and the second non-fungible token 134 associated with the routing information 164. The central server 140 may use the information of the primary non-fungible token 138 to reestablish network connectivity for at least a portion of the particular network equipment 152 in the failed network zone 120[1].

System Components
Network

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Network Equipment

Network equipment 152 or network equipment 154 is generally any computing equipment which is configured to process data and interact with the central server 140. Examples of the network equipment 152, but are not limited to, a personal computer, a desktop computer, a workstation, a server, a laptop, a tablet computer, a mobile phone (such as a smartphone), etc. The network equipment 152 may include a user interface, such as a display, a microphone, keypad, or other appropriate terminal equipment usable by user. The network equipment 152 may include a hardware processor, memory, and/or circuitry configured to perform any of the functions or actions of the network equipment 152 described herein. The hardware processor may include one or more processors operably coupled to the memory. The one or more processors may be any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The one or more processors may be a programmable logic device, a microcontroller, a microprocessor, or any suitable combination of the preceding. The one or more processors are configured to process data and may be implemented in hardware or software. For example, the processor may be 8-bit, 16-bit, 32-bit, 64-bit, or of any other suitable architecture. The processor may include an arithmetic logic unit (ALU) for performing arithmetic and logic operations. For example, a software application designed using software code may be stored in the memory and executed by the processor to perform the functions of the network equipment 152.

Network equipment 152 and 154 may store and/or include applications 153 and 155, respectively. The applications 153 and 155 may be software, mobile or web applications. Application 153 can be accessed from the network equipment 152. Application 155 can be accessed from the network equipment 154. The applications 153 and 155 may be associated with an organization entity that provides services and/or products to users.

Central Server 140

Central server 140 is generally a server, or any other device configured to process data and communicate with network equipment in a plurality of network zones 120 via the network 110. The central server 140 is generally configured to oversee the operations of the operation engine 144, as described further below in conjunction with the operational flows of the method 200 described in FIG. 2. The central server 140 may be a server implemented in the cloud and may also be organized in a distributed manner.

Processor 142 comprises one or more processors operably coupled to the memory 146. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs).

The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 148) to implement the operation engine 144. In this way, the processor 142 may be a special-purpose computer designed to implement the functions disclosed herein. In one embodiment, the processor 142 is implemented using logic units, FPGAs, ASICs, DSPs, or any other suitable hardware. The processor 142 is configured to operate to perform one or more operations as described in FIG. 1.

Network interface 145 is configured to enable wired and/or wireless communications (e.g., via network 110). The network interface 145 is configured to communicate data between the central server 140 and other devices (e.g., network equipment 152), databases, systems, or domains. For example, the network interface 145 may comprise a WIFI interface, a local area network (LAN) interface, a wide area network (WAN) interface, a modem, a switch, or a router. The processor 142 is configured to send and receive data using the network interface 145. The network interface 145 may be configured to use any suitable type of communication protocol as would be appreciated by one of ordinary skill in the art.

Memory 146 may be volatile or non-volatile and may comprise a read-only memory (ROM), random-access memory (RAM), ternary content-addressable memory (TCAM), dynamic random-access memory (DRAM), and static random-access memory (SRAM). Memory 146 may be a non-transitory computer-readable medium implemented using one or more disks, tape drives, solid-state drives, and/or the like. Memory 146 is operable to store the software instructions 148 and/or any other data or instructions. The software instructions 148 may store any suitable set of instructions, logic, rules, or code operable to be executed by the processor 142 to implement the processes and embodiments described below. In an example operation, memory 146 may store flag 160, configuration information 162, routing information 164, data object 166, a first set of operation parameters 172 of each of the particular network equipment, a second set of operation parameters 174 of a plurality of operating network components in the network 110, network topology 150, a first non-fungible token 132, a second non-fungible token 134, a third non-fungible token 136, a primary non-fungible token 138, and/or any other data or instructions. The machine learning model 168 may comprise machine learning algorithms including support vector machine, neural network, random forest, k-means clustering, etc. The machine learning model 168 may be implemented by a plurality of neural network (NN) layers, Convolutional NN (CNN) layers, Long-Short-Term-Memory (LSTM) layers, Bi-directional LSTM layers, Recurrent NN (RNN) layers, and the like.

Operation Engine

In some embodiments, an operation engine 144 may include, but is not limited to, one or more separate and independent software and/or hardware components of a server 140. The operation engine 144 may be implemented by the processor 142 to monitor operations of a plurality of network equipment in a plurality of network zones 120. The operation engine 144 may be implemented by the processor 142 to execute the software instructions 148 to receive a flag 160 that identifies a failed network zone. The failed network zone 120[1] may comprise particular network equipment 152 that have lost network connectivity in the network 110. In some embodiments, the operation engine 144 may be implemented by the processor 142 to execute the software instructions 148 to determine routing information 164 to provide network connectivity to the particular network equipment 152 and reestablish the network connectivity for at least a portion of the particular network equipment 152 in the failed network zone 120[1]. The operation of the disclosed system 100 is described in FIG. 2 below.

Identify a Failed Network Zone Associated with Network Equipment and Obtain Configuration Information In some embodiments, a computer environment 100 may include a plurality of network zones 120, such as network zone 120[1] and network zone 120[2]. Different network zones 120 may be located in different geographical areas. Each network zone may include a plurality of network equipment such as servers, computers, mobile devices, routers, etc. The plurality of network equipment in each network zone 120 may be located in the same geographical area and communicatively coupled to one another. The plurality of network equipment may be connected to one another in the network zone 120. For example, a network zone 120[1] includes a plurality of network equipment such as network equipment 152. A network zone 120[2] includes a plurality of network equipment such as network equipment 154.

The memory 146 of the central server 140 may store configuration information 162 associated with a plurality of network equipment or network components in a plurality of network zones 122. The configuration information 162 of each network equipment may include an identifier 161, an operation status (operating or failed), and a set of the operation parameters 172 required to communicate with other network equipment in the network 110. The identifier 161 of each network equipment may be an internet protocol (IP) address or a Media Access Control (MAC) address. The operation parameters of each of the particular network equipment may represent values or status of each of the particular network equipment which is configured to communicate with the other network equipment or network components in a corresponding network zone 122.

For example, the central server 140 may receive a flag 160 that identifies a failed network zone 120[1] which comprises particular network equipment 152 that have lost network connectivity in a network 100. The flag 160 associated with each of the particular network equipment 152 in the failed network zone 120[1] may comprise a plurality of parameters including an identifier of the failed network zone 120[1], a corresponding identifier 161 of each particular network equipment, an interaction identifier, a geographical location, and a role type. The geographical location of each of the particular network equipment 152 may include a longitude and a latitude. The interaction identifier may be indicative of a failed interaction associated with the particular network equipment 152 which is configured to communication with another network equipment and lost the network connectivity in the failed network zone 120[1].

In some embodiments, the central server 140 may obtain configuration information 162 associated with the particular network equipment 152 from the memory 146 based on a corresponding identifier 161 of each particular network equipment. The memory 146 of the central server 140 may store configuration information 162 associated with the network equipment in different network zones 120. The configuration information 162 associated with the particular network equipment 152 in the failed network zone 120[1] may include an IP address, a Media Access Control (MAC) address, a first set of the operation parameters 172 of the particular network equipment 152, a second set of operation parameters 174 of a plurality of operating network components in the network 110, or any other features associated with the particular network equipment 152.

The central server 140 may generate a first non-fungible token 132 based on the configuration information 162 associated with the particular network equipment 152 in the failed network zone 120[1]. The first non-fungible token 132 may be configured to authenticate or verify authentication of the flag 160 associated with the configuration information 162 and the particular network equipment 152 in the failed network zone 120[1]. The central server 140 may store the first non-fungible token 132 as blockchain data 131 in a blockchain network 130. The first non-fungible token 132 may include the configuration information 162 associated with the particular network equipment 152 in the failed network zone 120[1].

Determine Routing Information to Provide the Network Connectivity to the Particular Network Equipment In response to receiving the flag 160 that identifies a failed network zone 120[1] and generating the first non-fungible token 132, the central server 140 may be triggered to determine routing information 164 to provide network connectivity to the particular network equipment 152.

In some embodiment, the central server 140 may use the machine learning model 168 to determine a network topology 150 based on the flag 160, the configuration information 162, and one or more supplemental network paths in the network 110. For example, the machine learning model 168 may be trained to determine the network topology 150 associated with the particular network equipment in the failed network zone 120[1] for generating routing information 164 to provide network connectivity to the particular network equipment 152. The machine learning model 168 may be trained based on configuration information 162 associated with a plurality of operating network components 156 in the failed network zone 120, historical network topologies, a plurality of supplemental network paths, historical routing information, etc. The historical routing information may provide network connectivity to a plurality of network equipment in one or more failed network zones. The network topology 150 may include one or more network routes or communication paths to provide network connectivity to corresponding network equipment 152 in the failed network zone 120[1]. In one embodiment, the machine learning model 168 may be executed to calculate the nearest and fastest network route including corresponding network components 156 in the network topology 150 to provide the network connectivity to the particular network equipment 152. Each network route or communication path in the network topology 150 may include a plurality of operating network components 156 including servers, routes, switches, sub-networks, etc. In one embodiment, each operating network component 156 in the network topology 150 may communicate with the central server 140 and be associated with a corresponding IP address and configuration information 162 stored in the memory 146. In one embodiment, the operating network components 156 in the network 110 may be cloud-based network components which are operating in a private or public cloud services or systems. The operating network components 156 along each network route or communication path may be configured to communicate with each other in the network 110 to provide network connectivity to the particular network equipment 152 in the failed network zones 120[1].

The central server 140 may determine routing information 164 associated with the particular network equipment 152 in the failed zone 120[1] based at least in part upon the configuration information 162 and the network topology 150 of the network 110. For example, the routing information 164 may include one or more operating network components 156 along a nearest and fastest network path between the central server 140 and the failed network zone 120[1] to provide the network connectivity to the particular network equipment 152. In some embodiments, the routing information 164 may include corresponding configuration information 162 and operation parameters 174 of each operating network component along each corresponding network route to provide the network connectivity to the particular network equipment 152.

The center server 140 may generate a second non-fungible token 134 based at least in part upon the routing information 164. The center server 140 may validate the first non-fungible token 132 and the second non-fungible token 134 by generating a data object 166. The center server 140 may store the data object 166 in the memory 146. The data object 166 includes the configuration information 162 and the routing information 164 associated with the particular network equipment 152 in the failed network zone 120[1]. The center server 140 may check the data object 166 to determine whether there are any errors associated with the first non-fungible token 132 and the second non-fungible token 134. For example, the center server 140 may check the data object 166 by scanning the data object 166 using some default error codes to determine whether any errors are generated. The default error codes may be predefined based on rules to generate corresponding non-fungible tokens. In response to determining that no errors are associated the data object 166, the center server 140 may aggregate the first non-fungible token 132 and the second non-fungible token 134 to generate a primary non-fungible token 138. The center server 140 may send the data object 166 with the primary non-fungible token 138 to the blockchain network 130 to store them as block chain data 131. The primary non-fungible token 138 may include information associated with the flag 160, configuration information 162 and the routing information 164 associated with the particular network equipment 152 in the failed network zone 120[1].

The center server 140 may reestablish the network connectivity for at least a portion of the particular network equipment 152 based at least in part upon the information associated with the primary non-fungible token 138. The information of the primary non-fungible token 138 may be configured to provide the network connectivity to the particular network equipment 152 and enable the particular network equipment 152 to communicate with the central server 140 and other network equipment in the network 110.

Figure 2:
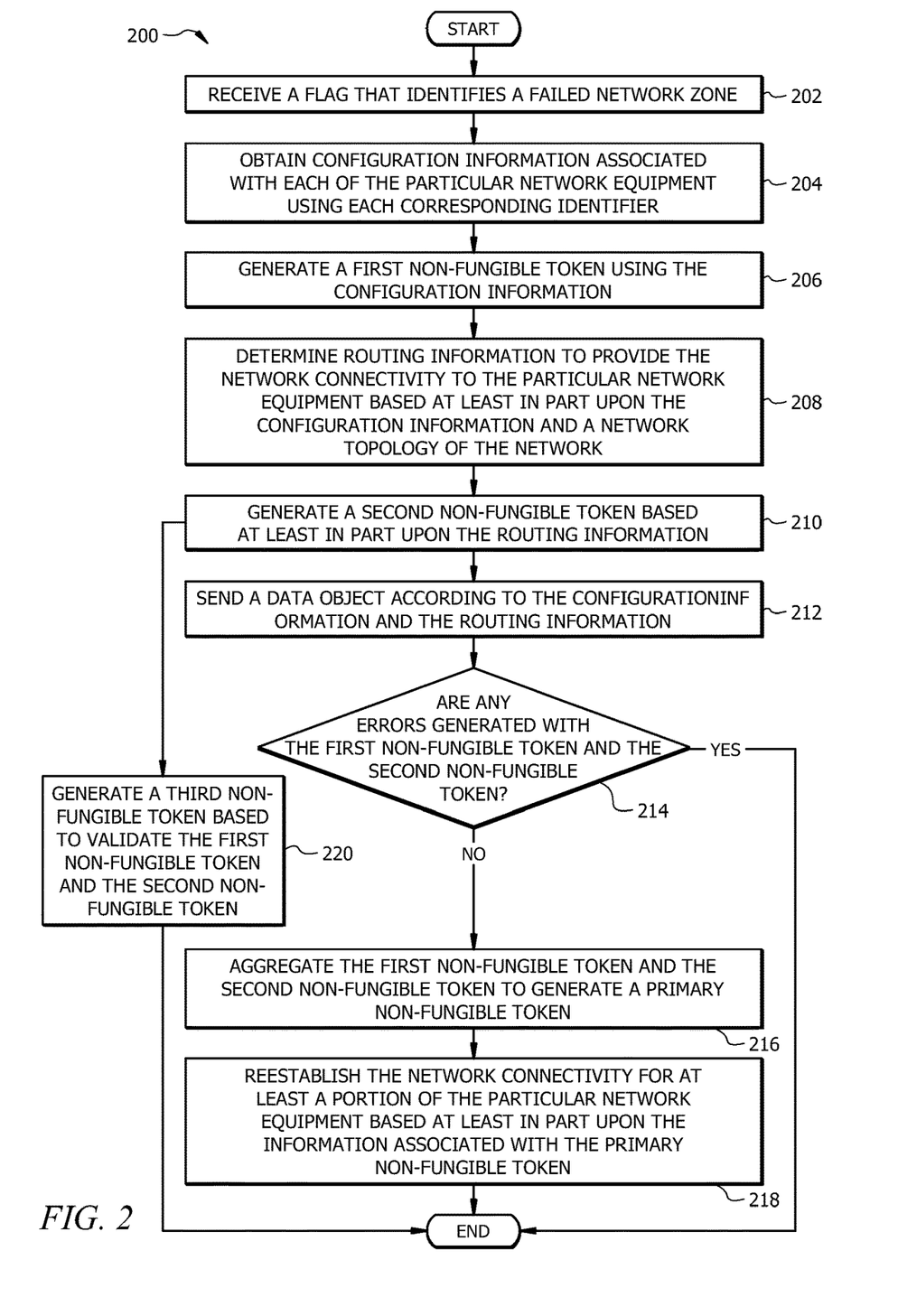
FIG. 2 illustrates an example operational flow of a method for reestablishing network connectivity for the particular network equipment in the failed network zone.

The process is described in detail in conjunction with the operational flows of the methods 200 illustrated in FIG. 2.

Example Operational Flow for Reestablishing Network Connectivity for Particular Network Equipment in a Failed Network Zone FIG. 2 illustrates an example flow of a method 200 for reestablishing network connectivity for particular network equipment in a failed network zone 120[1] in the system 110. Modifications, additions, or omissions may be made to method 200. Method 200 may include more, fewer, or other operations. For example, operations may be performed by the central server 140 in parallel or in any suitable order. While at times discussed as the system 100, processor 142, operation engine 144, machine learning model 168, or components of any of thereof performing operations, any suitable system or components of the system may perform one or more operations of the method 200. For example, one or more operations of method 200 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 202-220.

The operation engine 144 is executed by the processor 142 to detect a network connection failure in a network zone 120[1]. In response, the operation engine 144 of the central server 140 is triggered to be executed by the processor 142 to perform operations 202-220.

The method 200 begins at operation 202 where the processor 142 executes the operation engine 144 to receive a flag 160 that identifies a failed network zone 120[1]. The failed network zone 120[1] comprises particular network equipment 152 that have lost network connectivity in a network 110. Each particular network equipment 152 in the failed network zone 120[1] may be associated with a corresponding identifier 161.

At operation 204, the central server 140 may obtain configuration information 162 associated with each of the particular network equipment 152 in the failed network zone 120[1] using each corresponding identifier 161.

At operation 206, the central server 140 may generate a first non-fungible token 132 using the configuration information 162 associated with each of the particular network equipment 152. The first non-fungible token 132 with the configuration information 162 may be configured to authenticate a failed network zone 120[1] with the particular network equipment 152.

At operation 208, the central server 140 may be triggered to determine routing information 164 to provide the network connectivity to the particular network equipment 152 based at least in part upon the configuration information 162 and a network topology 150 of the network 110. In some embodiments, the central server 140 may determine, using a machine learning model 168, the network topology 150 based on the flag 160, the configuration information 162, and one or more supplemental network paths in the network 110.

At operation 210, the central server 140 may generate a second non-fungible token 134 based at least in part upon the routing information 164.

At operation 212, the central server 140 may securely validate the first non-fungible token 132 and the second non-fungible token 134 by sending a data object 166 to store in the memory 146 according to the configuration information 162 and the routing information 164.

At operation 214, the central server 140 may determine whether any errors are generated with the first non-fungible token 132 and the second non-fungible token 134. For example, the center server 140 may scan the data object 166 to check whether the data object 166 matches a default error code. In response to determining that the data object 166 does not match the default error code, the central server 140 may determine that no errors are generated with the first non-fungible token 132 and the second non-fungible token 134.

At operation 216, the central server 140 may aggregate the first non-fungible token 132 and the second non-fungible token 134 to generate a primary non-fungible token 138 in response to determining that no errors are generated.

At operation 218, the central server 140 may reestablish the network connectivity for at least a portion of the particular network equipment 152 in the failed network zone 120[1] based at least in part upon information associated with the primary non-fungible token 138.

At operation 220, the central server 140 may generate a third non-fungible token 136 based on the data object 166 to validate the first non-fungible token 132 and the second non-fungible token 134.

In some embodiments, the central server 140 may aggregate the first non-fungible token 132, the second non-fungible token 134 and the third non-fungible token 136 to generate a primary non-fungible token 138 associated with the network equipment 152 in the failed network zone 120[1]. These non-fungible tokens are cryptographically unique tokens that are linked to corresponding information associated with the particular network equipment 152 in the failed zone 120[1]. The central server 140 may determine a network topology 150 based at least in part upon the information associated with the primary non-fungible token 138.

In some embodiments, the machine learning model 158 may be deployed into one of the components of the operation engine 144 of the central server 140. The central server 140 may reestablish the network connectivity for at least a portion of the particular network equipment 152 based at least in part upon the information associated with the primary non-fungible token 138 in real time. Each operation of reestablishing network connectivity for the particular network equipment 152 may be authenticated, triggered and securely validated based on the information of with the first non-fungible token 132, the second non-fungible token 134, the third non-fungible token 136, and the corresponding primary non-fungible token 138.

In some embodiments, the central server 140 may generate and store a blockchain data 131 in a block chain network 130. The blockchain data 131 may include a first non-fungible token 132, a second non-fungible token 134, a third non-fungible 136 and the primary non-fungible token 138.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory operable to store configuration information associated with a plurality of network equipment, and
   a processor operably coupled to the memory, the processor configured to:
   receive a flag that identifies a failed network zone, wherein the failed network zone comprises particular network equipment that have lost network connectivity in a network, each particular network equipment being associated with a corresponding identifier;
   obtain the configuration information associated with each of the particular network equipment using each corresponding identifier;
   generate a first non-fungible token using the configuration information;
   determine routing information to provide network connectivity to the particular network equipment based at least in part upon the configuration information and a network topology of the network;
   generate a second non-fungible token based at least in part upon the routing information;
   validate the first non-fungible token and the second non-fungible token by sending a data object according to the configuration information and the routing information to determine whether any errors are generated;
   in response to determining that no errors are generated, aggregate the first non-fungible token and the second non-fungible token to generate a primary non-fungible token; and
   reestablish network connectivity for at least a portion of the particular network equipment based at least in part upon the information associated with the primary non-fungible token.

2. The system of claim 1, wherein the flag associated with the failed network zone comprises an identifier of the failed network zone, the corresponding identifier of each particular network equipment, and an interaction identifier, and a geographical location of the failed network zone.

3. The system of claim 1, wherein the processor is further configured to determine, using a machine learning model, the network topology associated with the particular network equipment in the failed network zone based on the flag, the configuration information, and a set of operation parameters of a plurality of operating network components in the network; and
   wherein the network topology comprises one or more network routes with corresponding operating network components to provide the network connectivity for the particular network equipment in the failed network zone.

4. The system of claim 3, wherein the configuration information associated with each of the particular network equipment in the failed network zone comprises the corresponding identifier and a set of operation parameters; and wherein the set of the operation parameters are used for each of the particular network equipment to communicate with other network equipment in the network.

5. The system of claim 3, wherein the routing information used to generate the second non-fungible token comprises one or more operating network components along a network route in the network topology to provide the network connectivity for the at least the portion of the particular network equipment.

6. The system of claim 1, wherein the data object represents a validation of the first non-fungible token and the second non-fungible token;
   wherein the data object comprises the configuration information and the routing information associated with the particular network equipment; and
   wherein the processor is further configured to generate a third non-fungible token based on the data object.

7. The system of claim 1, wherein the processor is further configured to store the first non-fungible token, the second non-fungible token, the third non-fungible token and the primary non-fungible token as blockchain data in a blockchain network sequentially.

8. A method comprising:
   receiving a flag that identifies a failed network zone, wherein the failed network zone comprises particular network equipment that have lost network connectivity in a network, each particular network equipment being associated with a corresponding identifier;
   obtaining configuration information associated with each of the particular network equipment using each corresponding identifier;
   generating a first non-fungible token using the configuration information;
   determining routing information to provide network connectivity to the particular network equipment based at least in part upon the configuration information and a network topology of the network;
   generating a second non-fungible token based at least in part upon the routing information;
   validating the first non-fungible token and the second non-fungible token by sending a data object according to the configuration information and the routing information to determine whether any errors are generated;
   in response to determining that no errors are generated, aggregating the first non-fungible token and the second non-fungible token to generate a primary non-fungible token; and
   reestablishing network connectivity for at least a portion of the particular network equipment based at least in part upon the information associated with the primary non-fungible token.

9. The method of claim 8, wherein the flag associated with the failed network zone comprises an identifier of the failed network zone, the corresponding identifier of each particular network equipment, and an interaction identifier, and a geographical location of the failed network zone.

10. The method of claim 8, further comprising:
    determining, using a machine learning model, the network topology associated with the particular network equipment in the failed network zone based on the flag, the configuration information, and a set of operation parameters of a plurality of operating network components in the network; and
    wherein the network topology comprises one or more network routes with corresponding operating network components to provide the network connectivity for the particular network equipment in the failed network zone.

11. The method of claim 10, wherein the configuration information associated with each of the particular network equipment in the failed network zone comprises the corresponding identifier and a set of operation parameters; and wherein the set of the operation parameters are used for each of the particular network equipment to communicate with other network equipment in the network.

12. The method of claim 10, wherein the routing information used to generate the second non-fungible token comprises one or more operating network components along a network route in the network topology to provide the network connectivity for the at least the portion of the particular network equipment.

13. The method of claim 8, wherein the data object represents a validation of the first non-fungible token and the second non-fungible token;
wherein the data object comprises the configuration information and the routing information associated with the particular network equipment; and
wherein the processor is further configured to generate a third non-fungible token based on the data object.

14. The method of claim 8, further comprising storing the first non-fungible token, the second non-fungible token, the third non-fungible token and the primary non-fungible token as blockchain data in a blockchain network sequentially.

15. A non-transitory computer-readable medium storing instructions that when executed by a processor causes the processor to:
receive a flag that identifies a failed network zone, wherein the failed network zone comprises particular network equipment that have lost network connectivity in a network, each particular network equipment being associated with a corresponding identifier;
obtain configuration information associated with each of the particular network equipment using each corresponding identifier;
generate a first non-fungible token using the configuration information;
determine routing information to provide network connectivity to the particular network equipment based at least in part upon the configuration information and a network topology of the network;
generate a second non-fungible token based at least in part upon the routing information;
validate the first non-fungible token and the second non-fungible token by sending a data object according to the configuration information and the routing information to determine whether any errors are generated;
in response to determining that no errors are generated, aggregate the first non-fungible token and the second non-fungible token to generate a primary non-fungible token; and
reestablish network connectivity for at least a portion of the particular network equipment based at least in part upon the information associated with the primary non-fungible token.

16. The non-transitory computer-readable medium of claim 15, wherein the flag associated with the failed network zone comprises an identifier of the failed network zone, the corresponding identifier of each particular network equipment, and an interaction identifier, and a geographical location of the failed network zone.

17. The non-transitory computer-readable medium of claim 15, wherein the instructions further cause the processor to:
determine, using a machine learning model, the network topology associated with the particular network equipment in the failed network zone based on the flag, the configuration information, and a set of operation parameters of a plurality of operating network components in the network; and
wherein the network topology comprises one or more network routes with corresponding operating network components to provide the network connectivity for the particular network equipment in the failed network zone.

18. The non-transitory computer-readable medium of claim 17, wherein the configuration information associated with each of the particular network equipment in the failed network zone comprises the corresponding identifier and a set of operation parameters; and wherein the set of the operation parameters are used for each of the particular network equipment to communicate with other network equipment in the network; and wherein the routing information used to generate the second non-fungible token comprises one or more operating network components along a network route in the network topology to provide the network connectivity for the at least the portion of the particular network equipment.

19. The non-transitory computer-readable medium of claim 15, wherein the data object represents a validation of the first non-fungible token and the second non-fungible token;
wherein the data object comprises the configuration information and the routing information associated with the particular network equipment; and
wherein the processor is further configured to generate a third non-fungible token based on the data object.

20. The non-transitory computer-readable medium of claim 15, wherein the instructions further cause the processor to: store the first non-fungible token, the second non-fungible token, the third non-fungible token and the primary non-fungible token as blockchain data in a blockchain network sequentially.

* * * * *